J. P. EVANS.
AUTOMOBILE ATTACHMENT TO PREVENT UNAUTHORIZED USE.
APPLICATION FILED FEB. 26, 1912.

1,058,166.

Patented Apr. 8, 1913.

3 SHEETS—SHEET 1.

J. P. EVANS.
AUTOMOBILE ATTACHMENT TO PREVENT UNAUTHORIZED USE.
APPLICATION FILED FEB. 26, 1912.

1,058,166.

Patented Apr. 8, 1913.

3 SHEETS—SHEET 2.

Witnesses
Sanford Evans
R. G. Adams

Inventor
John P. Evans

By
Attorney

J. P. EVANS.
AUTOMOBILE ATTACHMENT TO PREVENT UNAUTHORIZED USE.
APPLICATION FILED FEB. 26, 1912.

1,058,166.

Patented Apr. 8, 1913.

3 SHEETS—SHEET 3.

Witnesses
E. Sanford Evans
R. G. Adams

Inventor
John P. Evans

By Robt. D. Johnson
Attorney

UNITED STATES PATENT OFFICE.

JOHN P. EVANS, OF BIRMINGHAM, ALABAMA.

AUTOMOBILE ATTACHMENT TO PREVENT UNAUTHORIZED USE.

1,058,166.  Specification of Letters Patent.  Patented Apr. 8, 1913.

Application filed February 26, 1912. Serial No. 680,137.

*To all whom it may concern:*

Be it known that I, JOHN P. EVANS, a citizen of the United States of America, residing at Birmingham, in the county of Jefferson and State of Alabama, have invented certain new and useful Improvements in Automobile Attachments to Prevent Unauthorized Use, of which the following is a specification.

My invention relates to an attachment for motor vehicles which will prevent the unauthorized driving of the vehicle beyond a predetermined distance.

My object is to provide a simple and comparatively inexpensive apparatus which may be set by the owner to automatically throw out the clutch and hold it locked in open position after the car has traveled the predetermined distance for which the apparatus was adjusted, the apparatus being protected by a locked casing to prevent any unauthorized changing of the adjustment of parts or releasing of the clutch. For devices of this kind to be commercially successful, they must be inexpensive, convenient of access, and so simple in their operation that they can be both set and released without appreciable trouble. It is also essential that the entire apparatus should be so protected by its inclosing box that it can not be tampered with and that the duty required of it in stopping the car will be comparatively light to avoid the necessity for repairs. All these objects have been met in my invention which is conveniently located in the floor of the car, the mechanism being completely inclosed and being required only to throw in the clutch pedal and lock it, thus serving to disconnect the motor while leaving the car free to coast or to be drawn or moved to a point of safety.

My invention further comprises the details of construction and arrangements of parts hereinafter more particularly described and claimed, reference being had to the accompanying drawings, in which:—

Figure 1:
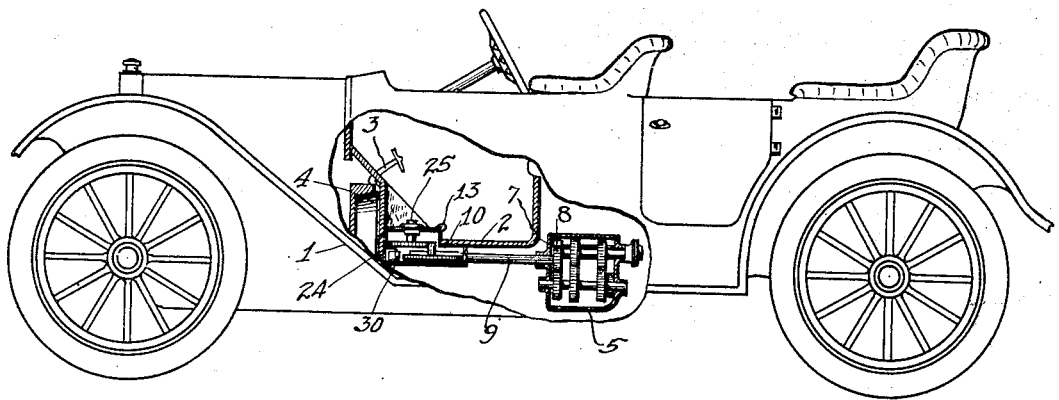
Figure 2:
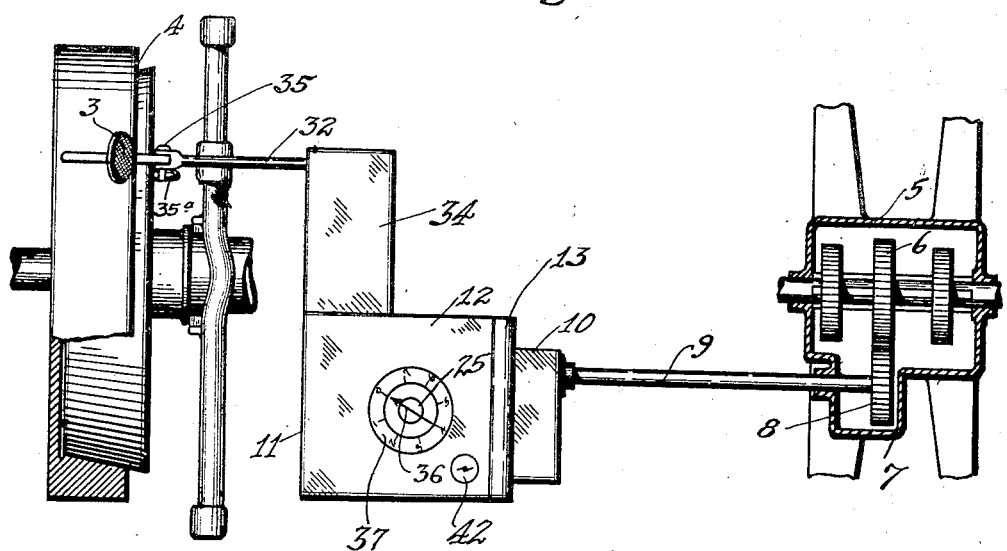
Figure 3:
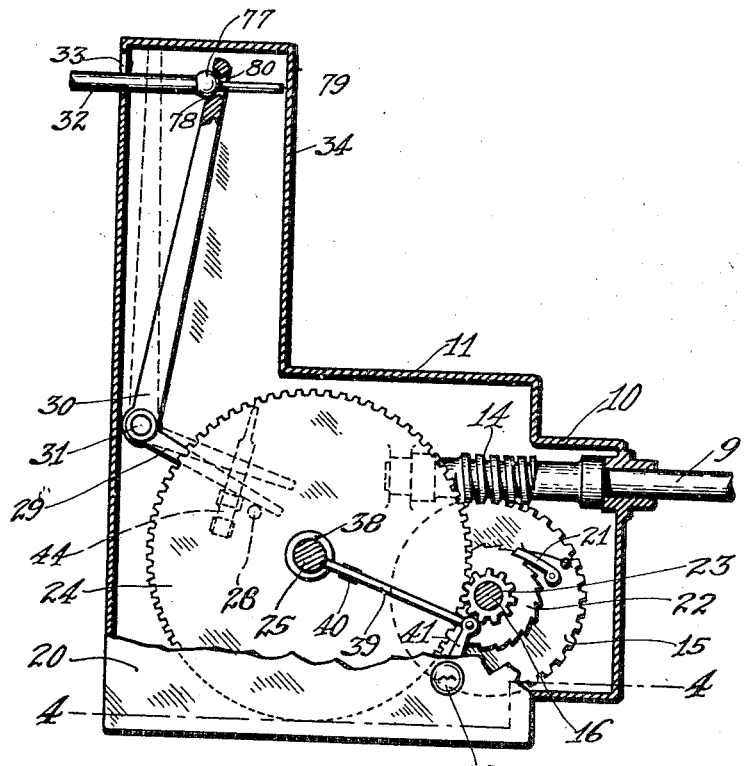
Figure 5:
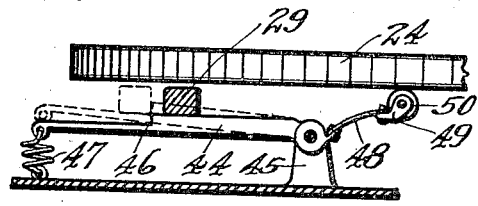
Figure 4:
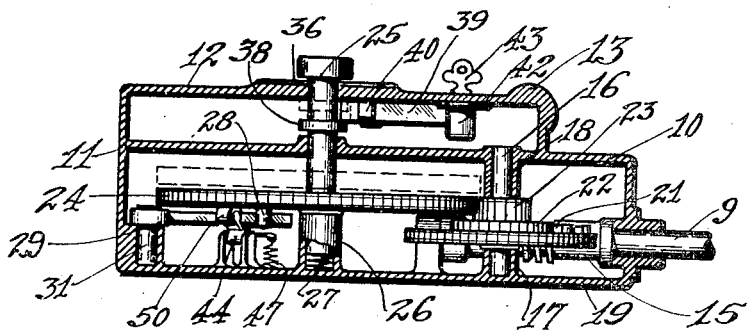
Figure 6:
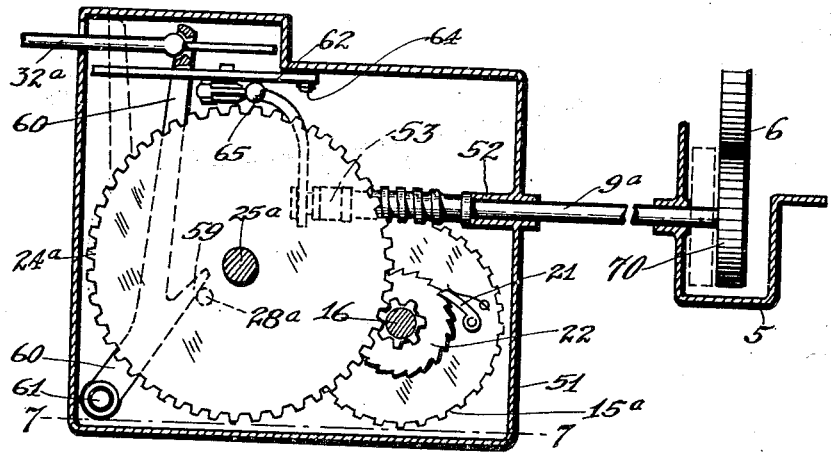
Figure 7:
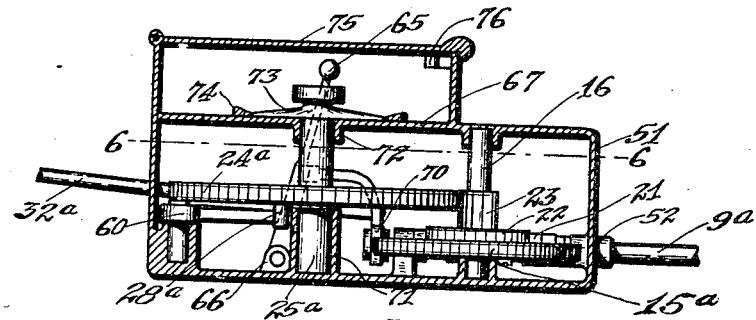
Figure 9:
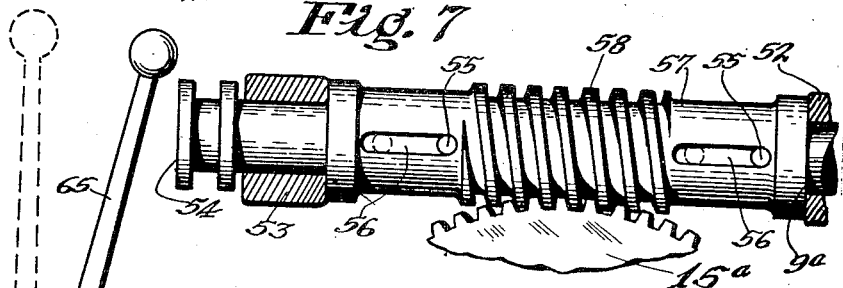
Figure 8:
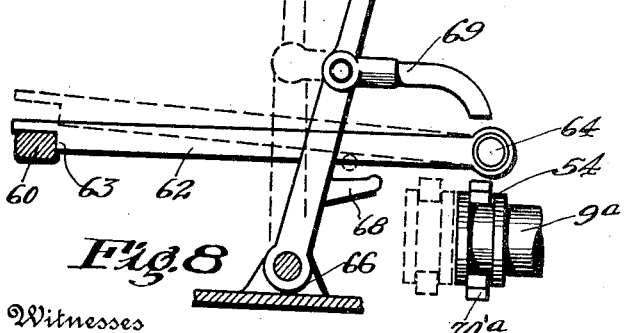

Figure 1 is a side elevation of a car equipped with my attachment, the attachment casing and gear casing being broken away. Fig. 2 is a top plan view of my attachment showing its driving connection to the transmission and its operating connection to the clutch. Fig. 3 is an enlarged plan view of the internal mechanism in the controller casing with the car broken away and the inner partition partly broken away. Fig. 4 is a vertical sectional elevation of Fig. 3 taken along the line 4—4. Fig. 5 is a detail view of the latch for holding the clutch locked in open position. Fig. 6 is a horizontal sectional view taken along the line 6—6 of Fig. 7 and illustrating a modification of my apparatus. Fig. 7 is a vertical sectional view taken along the line 7—7 of Fig. 6. Fig. 8 is a detail view of the lever control to disconnect the mechanism from the driving means of the car. Fig. 9 is a detail view of the worm gear drive for the actuator.

Similar reference numerals refer to similar parts throughout the drawings.

I have illustrated my invention applied to an automobile 1 having a bottom platform 2, a clutch pedal 3, a clutch 4 controlled by said pedal, and a transmission case 5 containing any suitable type of transmission gears 6, all of which parts may be of any standard construction. Case 5 is provided with an extension chamber 7 which receives a gear 8 in mesh with one of the gears 6 on the drive shaft to the rear axle. The gear 8 is fixed on a shaft 9 which passes through a suitable bearing in the forward wall of casing 7 and extends into the end 10 of the casing 11 which contains my controller apparatus and has a top 12 disposed above the floor 2 of the car and provided with a foot rest rail 13 on its forward edge. The end 10 of the casing is disposed below floor 2 and contains a worm gear 14 mounted on the inner end of shaft 9 and in mesh with a worm wheel 15 mounted loosely on a vertical shaft 16 which is journaled in bearings 17 and 18 respectively connected to the bottom 19 and to an intermediate partition 20 in the box. This worm wheel 15 carries a spring pressed dog 21 which, when the car is running forward, is moved in a direction to engage the teeth of a ratchet wheel 22 splined on shaft 16 and rotate a small gear 23 fixed to wheel 22 and adapted to mesh with peripheral teeth on a large actuator wheel 24. This actuator 24 is fixed on a vertical shaft 25 which is set in a step bearing 26 upon a coiled spring 27 therein which tends to raise the actuator to the dotted line position shown in Fig. 4. An actuating pin 28 on the underside of the actuator is adapted to engage the inner end 29 of a bell crank lever 30 and rock the same about a stud 31 connected to the bottom of the box. The lever is connected at its free end to a rod 32 which passes out through a side opening 33 in an extension 34 of casing 11, which houses the lever, and is connected at its outer end by a pin 35 to the clutch pedal 3 above its pivot. The pin is made non-removable by a seal or lock 35ª. The shaft 25 projects through the top 12 of the casing and has fixed thereon an arrow 36.

A dial 37 is suitably subdivided for distance so that the movement of the arrow, when the apparatus is connected up in the manner described with the driving machinery of the car, will be in proportion to the distance traveled by the car. Above the partition 20, the shaft 25 is provided with a collar 38 fixed thereon and adapted to be engaged, when the shaft is in lowered or full line position (Fig. 4), by a lock rod 39 which slides in a guide 40 attached to the top 12 and is adapted to be actuated by a key operated crank 41 to which it is pivotally connected. The crank 41 is mounted in a lock casing 42 attached to the top 12 and adapted to receive a controller key 43. Beneath the actuator 24 I provide a latch means for crank 30 which consists of a latch 44 pivoted in a bearing 45 and provided with a lock shoulder 46 which will engage the crank end 29 when thrown to its "clutch-open" position, see dotted lines Fig. 5. A coiled spring 47 is connected to the outer end of the latch and tends to pull it downwardly in opposition to a flat spring 48 connected to a portion of the latch projecting beyond its pivot and carrying at its outer end a caster 49 in which is pivoted a roller 50 that engages the underface of the actuator and is placed under tension thereby sufficient to overcome spring 47 and force the latch up to its dotted position as soon as end 29 of the lever is thrown by the actuator. When the wheel 24 is in raised position, the pressure on spring 48 is relieved and spring 47 pulls the catch to full line position and releases crank 30, leaving the clutch free to be drawn in and operated as desired by the foot pedal 3.

The operation of my preferred construction illustrated in Figs. 1 to 5 is as follows:—

Assuming that the key 43 has been turned to release the shaft 25, the spring 27 raises the latter and disengages the actuator 24 from engagement with gear 23 and moves its pin 28 out of the path of crank arm 29. If the clutch is now thrown in, the movement of the car will through gears 6 and 8, shaft 9, and gears 14 and 15, turn the gears 22 and 23 without effect on the shaft 16. When it is desired to set the mechanism to stop the car, the shaft 25 is turned relatively to the dial 37 until its pointer is opposite the mark for whatever the distance may be to which the car may be run before being automatically stopped. The key 43 is then turned to withdraw lock pin 39 and permit shaft 25 to be forced into its lowered or full line position (Fig. 4), in which position it is then locked by again moving pin 39 into position above the collar 38, whereupon the forward motion of the car, through the speed reducing gears shown, gradually turns the actuator 24 back toward its initial or critical position which it reaches when the car has traveled the predetermined distance. The pin will then engage end 29 of lever 30 and force it as shown in Fig. 3 to thereby move arm 22 to disengage the clutch. In doing this the lever slides over catch 44 until it passes beyond shoulder 46, whereupon spring 48 snaps the shoulder behind the lever and locks the parts with the clutch open until key 43 is inserted to unlock the shaft 25 and permit it to rise and release the catch. If the car backs while the apparatus is connected up, no reverse movement of parts results, due to the use of the pawl 21 and ratchet 22 in the transmission means.

I illustrate a modification of my invention in which the shaft 9ª enters a casing 51, being slidably supported in bearings 52 and 53 therein and having on its inner end a grooved collar 54 which is detachably fastened thereon beyond the inner bearings 53. The shaft has fixed on it a pair of pins 55 which project through slots 56 in a sleeve 57 which is provided with a worm 58 meshing with the main gear wheel 15ª. This gear acts through the same driving means described in connection with Fig. 3 to swing the actuator 24ª and cause its pin 28ª to engage with the arm 59 of a lever 60 pivotally mounted on a stud 61 and connected at its free end to the clutch operating rod 32ª. This lever 60 has resting on it a catch 62 having a lock shoulder 63 at one end and pivotally mounted at the other end on a stud 64 fastened in the side wall of the casing. When lever 60 is swung to dotted line position, having been operated by the pin 28ª, the shoulder 63 will drop into position to lock it in position to hold the clutch disengaged. In this construction I utilize a controller lever 65 which is pivoted to lugs 66 in the bottom of the casing and projects through a slot in the partition 67. This lever has a projection 68 which is adapted to engage and trip the catch 62 when the lever is thrown to dotted line position. It also has pivoted to it a curved arm 69 terminating in a yoke 70ª which engages in the groove in the collar 54 on the slidable drive shaft 9. When the control lever is moved to full line position it moves shaft 9 longitudinally until its gear 70 engages the gear 6, and lowers catch 62 until it rests on lever 60, in position to lock the latter when actuated by the apparatus. Shaft 25ª is held against longitudinal adjustment in its bearings 71 and 72, and at its upper end carries a pointer 73 which is adapted to be set with reference to a dial 74. This dial is mounted on the partition 67 and both it and the control lever 65 are protected by a hinged top 75 which is provided with a lock 76. When the apparatus has been set and actuated, to release it and the clutch, the top 75 must be unlocked and opened, and the control lever 65 thrown to its dotted line position (Fig. 8), which disengages catch 62, to free the pedal, and shifts shaft 9ª and gear 70 to the left to disengage the latter from gear 6 so that the automatic apparatus is wholly disconnected from the driving means of the car except when it is set in the manner described.

To leave the pedal free for normal operation, except when the levers 30 and 60 have been thrown and locked by the automatic mechanism, I provide the inner end of the connecting rods 32 and 32ª with a ball face 77 which seats in a socket 78 in levers 30 and 60 and has an extension 79 which slides freely through an opening 80. This leaves the levers and connecting rods slidingly connected until the former are operated when they engage the ball faces 77 and force the connecting rods forward to shift the clutch pedal 3 and release the clutch.

Having thus described my invention, what I claim as new and desire to secure by Letters Patent, is:—

1. In an automatic device for stopping motor cars, a movable element mounted on a motor car, means to move said element responsive to the movement of the car, clutch mechanism interposed in the car propelling means and normally operable by the clutch pedal, means operable by said element at a predetermined point in its movement to throw the clutch open and means to lock it in that position, and a locked inclosure to protect said lock for the clutch.

2. The combination with a driving mechanism for a motor car which includes a pedal operated clutch, of a locked casing, a movable element therein, a speed reducing actuating means to move said element proportionally to the movement of the car, an actuator on said element, means to adjust said actuator relatively to a predetermined point, mechanism actuated by said actuator when it arrives at said predetermined point which is connected to the clutch means and disengages the same, and means within said casing to lock said clutch in open position.

3. The combination with a motor operated driving mechanism of an automobile, of a pedal operated clutch therein, speed reducing driving means operated by said mechanism, an actuator driven by said speed reducing means, means to set said actuator at different positions relative to a fixed point toward which it is moved by said transmission means when the car is running, a crank operated by said actuator at said predetermined point, a connection from the crank to the clutch which normally leaves the clutch free and which is, when moved by said actuator, adapted to pull down the clutch pedal and open the clutch, a locked casing, and a catch therein to hold the clutch in its locked position, substantially as described.

4. In an automobile, a clutch in the main driving mechanism, a pedal operated means for opening the clutch, means driven by the parts movable with the car which are adapted under predetermined conditions to open the clutch, means to lock the clutch in open position, and a locked inclosure to protect said latter means, substantially as described.

5. In an automobile, a clutch in the main driving mechanism, a pedal operated means for opening the clutch, means driven by the parts movable with the car which are adapted under predetermined conditions to open the clutch, means to adjust said clutch opening means by hand to vary its movement prior to said predetermined operating conditions, means to lock the clutch in open position, a locked inclosure to protect said latter means and said hand adjusted means, and a visible indicator for the movement of said clutch opening means, substantially as described.

6. An attachment for automobiles, comprising a locked casing, an actuator therein, means to move said actuator proportionally with the movement of the car, means for actuating the clutch which disconnects the motor from the driving axle, which means projects into said casing into position to be operated by said actuator, means to adjust by hand the position of the actuator relative to its position when engaging said clutch operating means, a distance scale for setting said actuator, a pointer which moves with said actuator relatively to said scale and is visible without said casing, and a latch means in said casing to catch and hold the clutch operating means when moved by said actuator to open the clutch.

7. The combination with the pedal operated clutch of an automobile, of an actuator, speed reducing means to drive said actuator responsive to the movement of the car, mechanism for releasing the clutch which is adapted to be operated by said actuator when in a critical position, a latch adapted to automatically engage and lock said mechanism when moved to release the clutch, means to disengage said actuator from its driving means to permit it to be set by hand relative to its critical position, means adapted to automatically release said catch when said actuator is shifted for disengagement, and an inclosing casing for said actuator and catch, substantially as described.

8. In a device for stopping automobiles, the combination of a closed casing set in the flooring of the car, an actuator in said casing, means to rotate said actuator responsive to the movement of the car, key controlled means to move said actuator to release it from its driving means, means projecting without the casing for setting said actuator by hand with reference to a critical position thereof, a device adapted to be operated by the actuator when moved to its critical position by its driving means, a connection from said device to the main pedal operated clutch of the car, a catch to engage said device and lock it in its actuated position, and means, controlled by the movement of the actuator to disengage it from its driving means, to release said catch, substantially as described.

9. An automobile attachment comprising in combination with a gear on the drive shaft for the rear axle and the pedal operated clutch, of a gear meshing with the gear aforesaid, a shaft driven thereby, a speed reducing train of gears driven by said latter shaft, a rotatable actuator driven by said train of gears, means to disengage said actuator from said gears, an indicator movable with the actuator, a distance scale for said indicator, means to set the actuator for traveling a given distance before reaching a critical position, an arm adapted to be engaged by the actuator when in said critical position and moved, a connection from said arm to said clutch to release it, a catch to lock the arm in its clutch releasing position, means to lock the actuator in mesh with said train of gears, means to release the latch when the actuator is disengaged from said gears, and an inclosing casing inclosing the lock means for the actuator and the catch for said arm, substantially as described.

10. An automobile attachment comprising in combination with a gear on the drive shaft for the rear axle and the pedal operated clutch, of a gear meshing with the gear aforesaid, a shaft driven thereby, a speed reducing strain of gears driven by said latter shaft, means to prevent a reverse movement of said gears when the car moves backward, a rotatable actuator driven by said train of gears, means to disengage said actuator from said gears, an indicator movable with the actuator, a distance scale for said indicator, means to set the actuator for traveling a given distance before reaching a critical position, an arm adapted to be engaged by the actuator when in said critical position and moved, a connection from said arm to said clutch to release it, a catch to lock the arm in its clutch releasing position, means to lock the actuator in mesh with said train of gears, means to release the latch when the actuator is disengaged from said gears, and an inclosing casing inclosing the lock means for the actuator and the catch for said arm, substantially as described.

In testimony whereof I affix my signature in presence of two witnesses.

JOHN P. EVANS.

Witnesses:
NOMIE WELSH,
R. D. JOHNSTON, Jr.